(12) United States Patent
Nakata

(10) Patent No.: US 6,466,279 B1
(45) Date of Patent: Oct. 15, 2002

(54) LIQUID CRYSTAL DISPLAY DEVICE AND PROCESS FOR PRODUCING SAME IN WHICH FORMING FIRST AND SECOND ORGANIC INSULATING LAYERS USING CURING AND HALF CURING PROCESS

(75) Inventor: Shinichi Nakata, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/294,381

(22) Filed: Apr. 20, 1999

(30) Foreign Application Priority Data

Apr. 23, 1998 (JP) .......................... 10-113659

(51) Int. Cl.[7] .................. G02F 1/136; G02F 1/1333
(52) U.S. Cl. .................. 349/42; 349/138; 349/122; 349/158
(58) Field of Search .......................... 349/42, 158, 138, 349/122; 438/30

(56) References Cited

U.S. PATENT DOCUMENTS

| | | | | |
|---|---|---|---|---|
| 5,919,532 A | * | 7/1999 | Sato et al. ...................... 428/1 |
| 5,920,083 A | * | 7/1999 | Bae .............................. 257/59 |
| 6,038,008 A | * | 3/2000 | Kim et al. .................. 349/138 |
| 6,100,954 A | * | 8/2000 | Kim et al. .................. 349/138 |
| 6,141,066 A | * | 10/2000 | Matsushima ................. 349/38 |
| 6,157,420 A | * | 12/2000 | Kubota et al. ............... 349/147 |
| 6,246,453 B1 | * | 6/2001 | Zhang et al. .................. 349/39 |
| 6,284,558 B1 | * | 9/2001 | Sakamoto ..................... 438/30 |
| 6,292,241 B1 | * | 9/2001 | Hiratno ....................... 349/113 |
| 6,307,611 B1 | * | 10/2001 | Kim et al. .................. 349/138 |
| 6,335,771 B1 | * | 1/2002 | Hiraishi ....................... 349/42 |
| 6,337,723 B1 | * | 1/2002 | Bae .............................. 349/43 |

FOREIGN PATENT DOCUMENTS

JP          9-152625          6/1997
JP          10-96963          4/1998

* cited by examiner

*Primary Examiner*—Toan Ton
*Assistant Examiner*—Mike Qi
(74) *Attorney, Agent, or Firm*—Sughrue Mion, PLLC

(57) ABSTRACT

A liquid crystal display device which includes first and second organic interlaminar insulating films between pixel electrode and wire. The first interlaminar insulating film directly covers source electrode, source wire, drain electrode and back channel. Underlying one of the organic interlaminar insulating films directly contacts a channel part of a TFT. This provides an active matrix type liquid crystal display device with high transmittance and capable of bright displaying, which includes an active matrix wiring substrate having a structure of overlapping wires with a pixel electrode. The device can be prepared at low cost only through 5 photolithographic steps, i.e., without increasing the photolithographic steps as compared with those of the prior liquid crystal display device having high aperture ratio.

10 Claims, 5 Drawing Sheets

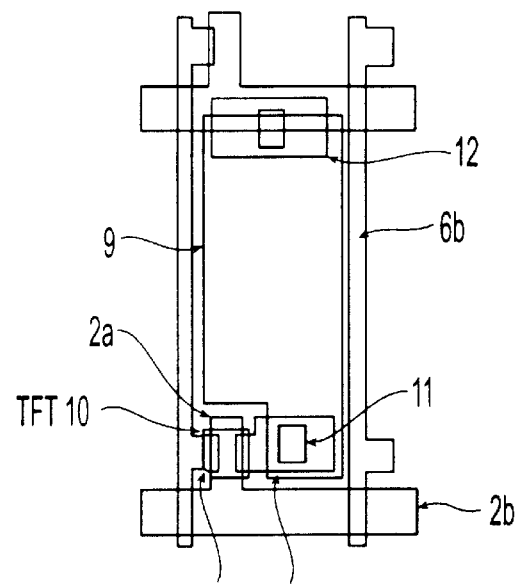
*Fig. 3(a)*
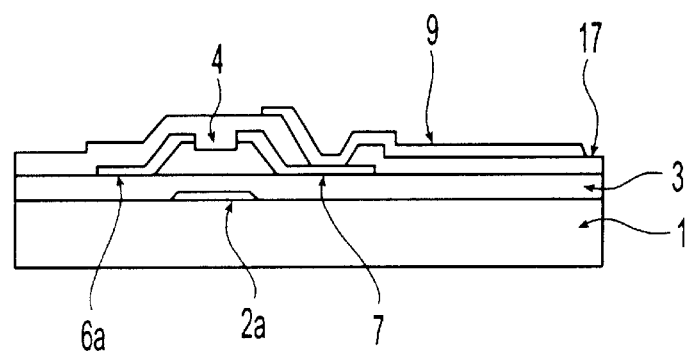
*Fig. 3(b)*
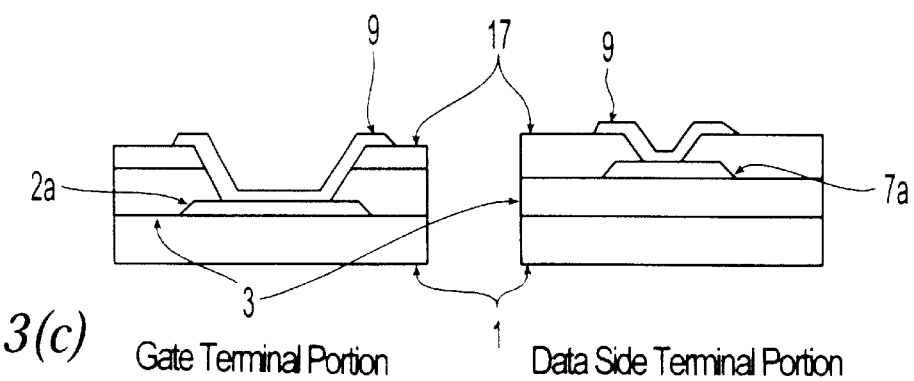
*Fig. 3(c)*    Gate Terminal Portion      Data Side Terminal Portion Gate Terminal Portion    Data Side Terminal Portion

US 6,466,279 B1

LIQUID CRYSTAL DISPLAY DEVICE AND PROCESS FOR PRODUCING SAME IN WHICH FORMING FIRST AND SECOND ORGANIC INSULATING LAYERS USING CURING AND HALF CURING PROCESS

FIELD OF THE INVENTION

The present invention relates to a liquid crystal display device, more especially to the improvement of a process for preparing an active matrix wiring substrate involved in it.

BACKGROUND

FIG. 3 is a schematic view of a channel-etched TFT formed on an active matrix wiring substrate involved in a conventional liquid crystal display device. FIG. 3(a) is a plan; FIG. 3(b), a cross sectional view; and FIG. 3(c), a fragmentary cross sectional view showing its terminal. Referring to FIG. 3(b), a gate electrode 2a is formed on a transparent insulating substrate 1. A gate insulating film 3 is formed to cover the gate electrode 2a. A semiconductive layer 4 is further formed thereon so as to overlie the gate electrode 2a. Source electrode 6a and drain electrode 7 are separated from each other on the central of the semiconductive layer 4, and connected to the same semiconductive layer 4 through an interposed ohmic is etched to contact layer 5. An area of the ohmic contact layer 5 disposed between the source and drain electrodes 6a and 7 leave it only between the semiconductive layer 4 and each of the source and drain electrodes 6a and 7. Further, a passivation film 17 is formed thereon so as to cover the surface thereof. On the passivation film 17, a transparent conductive film to provide a pixel electrode 9 is connected to the drain electrode 7 interposed with a contact through-hole 11 formed through the passivation film 17.

Next, a process for preparing the active matrix wiring substrate shown in FIG. 3 will be explained below in reference to FIG. 4.

(A) A first patterning step is carried out in which a conductive layer made of Al, Mo, Cr or the like is deposited on a transparent insulating substrate made of glass or the like to a thickness of 100 to 200 nm with a sputtering apparatus, and then gate wire 2b, gate electrode 2a and gate terminal portion 2c which is to be connected to an outside signal processing substrate for displaying are formed by a photolithographic step.

(B) Next, a second patterning step is carried out in which a gate insulating film 3 made of silicon nitride or the like, a semiconductive layer 4 made of amorphous silicon and an ohmic contact layer 5 made of n+-type amorphous silicon are laminated successively in this order to a thickness of about 400 nm, about 300 nm and about 50 nm, respectively with a PCVD apparatus, and then the semiconductive layer 4 and ohmic contact layer 5 are patterned at the same time.

(C) Then, a third patterning step is carried out in which source electrode 6a, source wire 6b, drain electrode 7 and data side terminal portion 7a are formed by photolithographic processing after depositing Mo, Cr or the like to a thickness of about 150 nm with a sputtering apparatus so as to cover the gate insulating film 3 and ohmic contact layer 5. Unnecessary part of the ohmic contact layer 5 is removed which is the part except a portion that is positioned under the source and drain electrodes 6a and 7 to form a channel part of a TFT.

(D) Thereafter, a forth patterning step is carried out in which an inorganic passivation film 17 of silicon nitride is formed to a thickness of about 100 to 200 nm with a PCVD apparatus so as to cover a back channel of the TFT, source electrode 6a, source wire 6b, drain electrode 7 and the terminal portions; a contact through-hole 11 is formed for bringing the drain electrode 7 into contact with a pixel electrode 9; and unnecessary part of the passivation film 17 which is located on the data side terminal 7a portion and unnecessary parts of the gate insulating film 3 and the passivation film 17 which are located on the gate terminal 2c portion are removed.

(E) Finally, a fifth patterning step is carried out after forming a transparent conductive film which is to be changed into the pixel electrode 9 with a sputtering apparatus.

By the above explained five patterning steps, a liquid crystal display device having the active matrix wiring substrate shown in FIG. 3 whose preparing steps are greatly reduced can be prepared.

However, the above conventional liquid crystal display device (hereinafter referred as to "prior art I") requires screening of light by means of a black matrix provided on a CF substrate in order to inhibit the leak of light from the space between the gate wire 2b and the pixel electrode 9 and from the space between the source wire 6b and the pixel electrode 9 as shown in FIG. 3(a). In order to avoid the problems concerning the accuracy in superimposing the CF substrate on the active matrix wiring substrate, the light screening region of the black matrix needs to have a large space. As a result, the aperture ratio of the liquid crystal display device becomes low. On this account, the prior art I has such a problem that the transmittance of the liquid crystal display device becomes low.

Japanese Patent Kokai-Publication JP-A-9-152625(1997) (hereinafter referred as to "prior art II") discloses, as a means of increasing the aperture ratio, a process for overlapping the pixel electrode 9 with each of the wires and thereby removing the black matrix of the CF side. FIG. 5 is a cross sectional view showing a channel protecting TFT on an active matrix wiring substrate of the prior art 2. Referring to FIG. 5, the structure of the channel protecting TFT in the active matrix wiring substrate will be explained as follows. There are a transparent insulating substrate 1 and a gate electrode 2a which is provided thereon and connected to a gate wire 2b. They are covered with a gate insulating film 3 on which a semiconductive layer 4 is provided so as to overlie the gate electrode 2a. On the central part of the semiconductive layer 4, a channel protecting layer 13 is provided. There is provided a n+-type Si layer which covers both terminals of the channel protecting layer 13 as well as a part of the semiconductive layer 4 and is divided into two pieces to provide source electrode 6a and drain electrode 7. On the outside terminal of one piece of the n+-type Si layer which is to be the source electrode 6a, transparent conductive film 14 and metallic later 15 are provided in this order to form a source wire 6b of a two-layered structure. Similarly, on the outside terminal, other piece of the n+-type Si layer which is to be drain electrode 7, transparent conductive film 14 and metallic later 15 are provided in this order. The transparent conductive film 14 is prolonged and connected to the pixel electrode 9 to form a connecting electrode. Further, there is provided an interlaminar insulating film which covers the TFT, the gate wire 2b, the source wire 6b and the connecting electrode. On the interlaminar insulating electrode, a transparent conductive film which is to be the pixel electrode 9 is provided and connected to the drain electrode 7 of the TFT by the transparent conductive film of the connecting electrode through a contact through-hole formed through the interlaminar insulating film.

These characteristic features of the liquid crystal display device of the prior art II reside in that the pixel can overlap the wires without increasing a capacity between the pixel electrode 9 and each of the wires to provide a liquid crystal display device having a large aperture ratio and thereby being capable of displaying a bright image by forming a low dielectric interlaminar insulating film thickly between the pixel electrode 9 and the source electrode 6a as well as between the pixel electrode 9 and source wire 6b.

SUMMARY OF THE DISCLOSURE

However, there have been encountered various problems during the course of the investigations toward the present invention. Namely, the aforementioned prior art II requires 9 patterning steps including newly additional preparing steps for forming the interlaminar insulating film and for making the contact through-hole which is to be in contact with the pixel electrode. Accordingly, a problem is caused that the production cost of the liquid crystal display device needs must be increased greatly.

Further, where it is attempted to apply the art of improving the aperture ratio by using this interlaminar insulating film to the process for preparing the active matrix wiring substrate of the prior art I having a reduced number of manufacturing steps, it is necessary to carry out dry etching to remove unnecessary part of the passivation film 17 located on the data side terminal 7a portion, which simultaneously removes unnecessary parts of the gate insulating film 3 and passivation film 17 located on the gate terminal 2c portion by applying a photosensitive organic interlaminar film 8c as a mask as shown in FIGS. 6(a) and 6(b). In case where the gate insulating film 3 and the passivation film 17 which are made of silicon nitride are etched, fluorine-containing gas is used. This causes a problem that the photosensitive organic interlaminar film 8c is also etched off.

Alternatively, another process could be also considered for improving the aperture ratio which is similar to the above process but different in using a non-photosensitive acrylic resin, coating a positive photosensitive resist (photoresist) thereon, and etching the acrylic resin and the silicon nitride film at the same time. However, obtainable etching selectivity of the positive photoresist to the silicon nitride film is no more than about 1. Accordingly, even necessary part of the positive photoresist would disappear in the course of etching the acrylic resin and the silicon nitride film. This causes a problem of also etching necessary part of the acrylic resin which cannot be avoided. Further, there is also caused another problem of increase in the cost as compared with the channel-etched TFT of the prior art 1 by forming the interlaminar insulating film consisting of the organic insulating film on the passivation film 17 made of silicon nitride film deposited by using a conventional PCVD apparatus.

In order to solve these problems, it has been studied to impart the functions of not only the interlaminar insulating film but also the passivation film 17 to the organic insulating film without forming the expensive passivation film which requires the use of the PCVD apparatus. However, the passivation film requires the function of blocking impurity ions and moisture which penetrate into the channel portion in order to maintain the reliability of the liquid crystal display device. When the organic insulating film made of acrylic resin, polyimide resin or the like is directly in contact with the channel portion, a problem is entrained that transistor properties deteriorate by the penetration of impurity ions and moisture originated from a liquid crystal material and/or of ions originated from the organic resins.

The present invention has been achieved in consideration of the above problems. It is an object of the present invention to provide a novel simple process for forming interlaminar insulating films between the pixel electrode and wires in the liquid crystal display device, which includes an active matrix wiring substrate having a structure of overlapping the wires with the pixel electrode.

Also it is another object of the present invention to provide an active matrix type liquid crystal display device with high transmittance and capable of bright displaying as well as a process for manufacturing same, which can be prepared at low cost only through 5 photolithographic steps, i.e., without increasing the photolithographic steps as compared with those involved in a process for preparing the conventional liquid crystal display device having high aperture ratio.

According to an aspect of the present invention there is provided a liquid crystal display device which comprises first and second organic interlaminar insulating films between pixel electrode(s) and wire(s). The first organic interlaminar insulating film directly covers source electrode(s), source wire(s), drain electrode(s) and back channel(s). Underlying one of the organic interlaminar insulating films is directly in contact with a channel part of a TFT.

In the above liquid crystal display device of the present invention, the first organic interlaminar insulating film preferably contains at least one organic layer forming material selected from the group consisting of polysilazane, siloxane resin and benzocyclopolybutene polymer.

Preferable water absorption of the organic layer forming material is not more than 1%.

The second organic interlaminar insulating film preferably contains an organic layer forming material of an acrylic family resin which is soluble in dimethylene glycol methylethyl ether.

According to a second aspect of the present invention, there is provided a process for preparing a liquid crystal display device, including the steps of:

(A) forming a metallic thin film on a transparent electrode substrate(preferably with a sputtering apparatus) followed by forming gate electrode, gate wire and gate terminals by photolithographic processing;

(B) forming successively a-Si layer which forms a semi-conductive layer and $n^+$-type Si layer which forms an ohmic contact layer to cover the gate electrode and the gate wire followed by pattering both of the layers into islands;

(C) forming a metallic thin film on the both layers (preferably with a sputtering apparatus) followed by forming source electrode, source wire, drain electrode and data side terminal by photolithographic processing, removing unnecessary part of the $n^+$-type Si layer between the source electrode and the drain electrode to form a back channel;

(D) forming a first organic interlaminar insulating layer over the laminated surface of the substrate including the back channel (e.g., by spin coating) followed by curing completely, forming a second organic interlaminar insulating layer thereon (e.g., by spin coating) followed by half curing, coating further thereon a positive photoresist containing a novolak resin as its essential ingredient (e.g., by spin coating) followed by pre-baking, partially light-exposing the positive photoresist with a light-exposing apparatus to be selectively solbilized and at the same time selectively solvilizing the second organic interlaminar insulating film and removing the solvilized portion of the positive photoresist and the second organic interlaminar insulating film therebeneath to make a contact-through hole;

(E) after mid-baking in an oven, removing unnecessary parts of the first organic interlaminar insulating film and the gate insulating film which are uncovered with a mask of the positive photoresist remained followed by removing the positive photoresist; and (F) forming a transparent conductive film (preferably by using a sputtering apparatus) followed by patterning it into pixel electrode(s).

In the above process of the present invention, the first organic interlaminar insulating film found in the step (D) preferably contains at least one organic layer forming material selected from the group consisting of polysilazane, siloxane resin and benzocyclopolybutene polymer.

Preferable water absorption of the organic layer forming material is not more than 1%.

The second organic interlaminar insulating film preferably contains an organic layer forming material of an acrylic family resin which is soluble in dimethylene glycol methylethyl ether.

Preferable solvent of the novolak resin found in the (D) step is a mixture of 2-heptane and ethyl 3-ethoxydiazidosulfonate.

It is preferable that the half curing of an acrylic family resin in the step (D) is performed by pre-baking at 100 to 200° C. for 1 to 4 minutes and that the novolak resin is pre-baked at temperatures ranging from 90 to 120° C. which do not exceed the pre-baking temperature of the second organic interlaminar insulating film for 1 to 4 minutes.

The positive photoresist in the step (D) is preferably developed by using a tetramethyleneammonium hydroxide solution.

BRIEF DESCRIPTION OF THE DRAWINGS

FIG. 1 is a view of a structure of an embodiment showing one pixel portion of an active matrix wiring substrate in a liquid crystal display device of the present invention.

FIG. 3 is a view of a structure showing one pixel portion of an active matrix wiring substrate in a conventional liquid crystal display device. FIG. 3(a) is a plan; FIG. 3(b), a cross sectional view of its TFT part; and FIG. 3(c), a cross sectional view of its terminal portion.

DESCRIPTION OF THE PRERRED EMBODIMENTS

The embodiment of the present invention will be explained as follows.

Figure 1A:
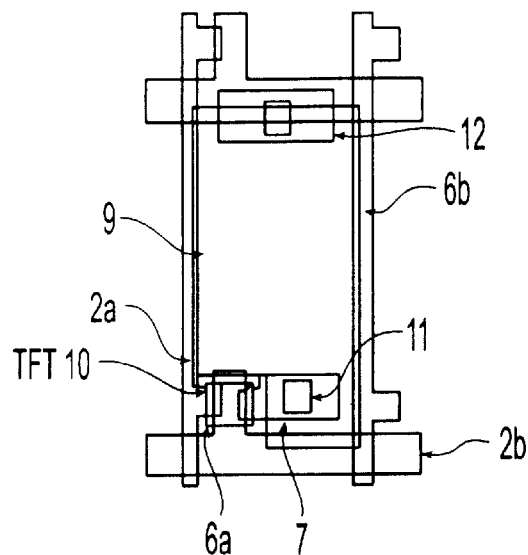
FIG. 1(a) is a plan.
Figure 1B:
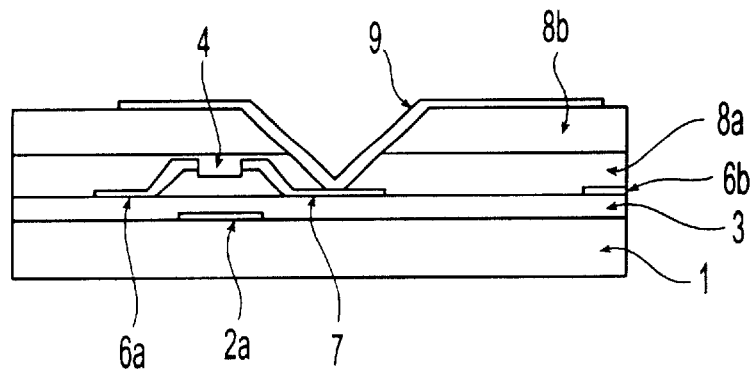
FIG. 1(b), a cross sectional view of its TFT part.
Figure 1C:
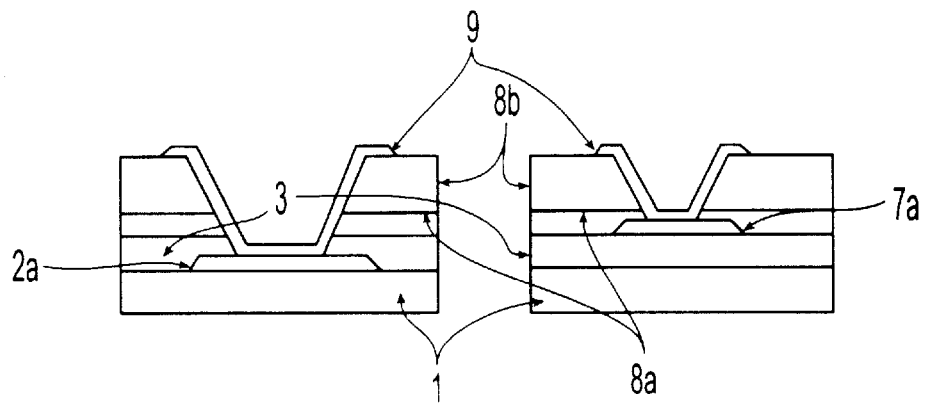
FIG. 1(c), a cross sectional view of its terminal portion.
Figure 2A:
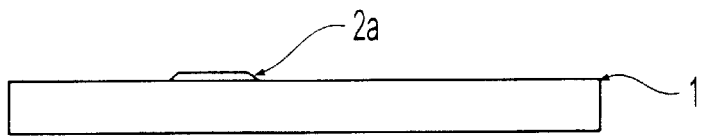
FIG. 2 shows a flow of a process for preparing an active matrix wiring substrate in a liquid crystal display device of the present invention.
Figure 2B:
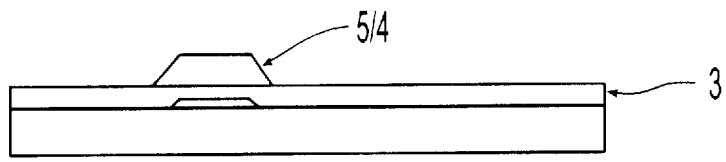
Figure 2C:
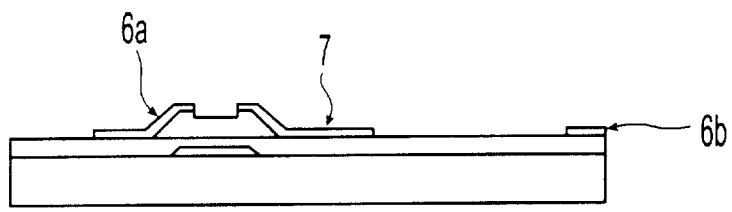
Figure 2D:
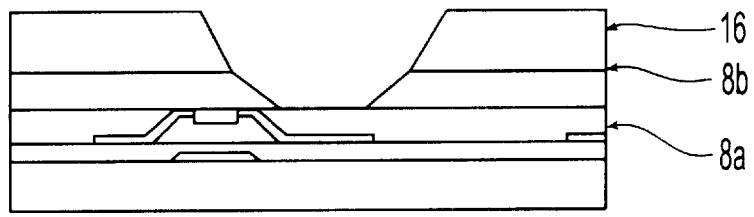
Figure 2E:
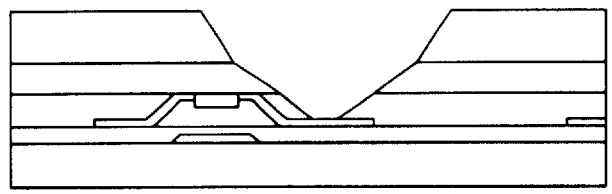
Figure 2F:
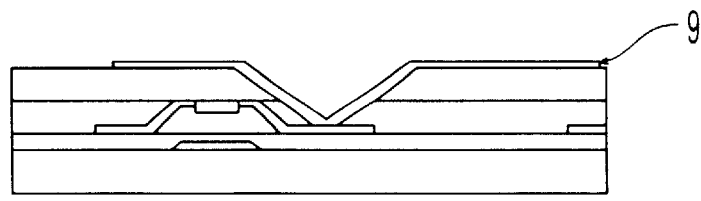
Figure 4A:
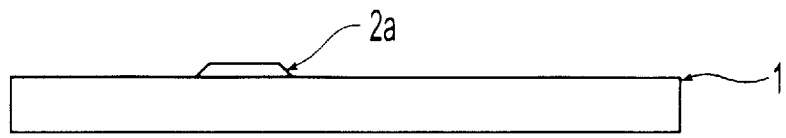
FIG. 4 shows a flow of a process for preparing the active matrix wiring substrate in the conventional liquid crystal display device.
Figure 4B:
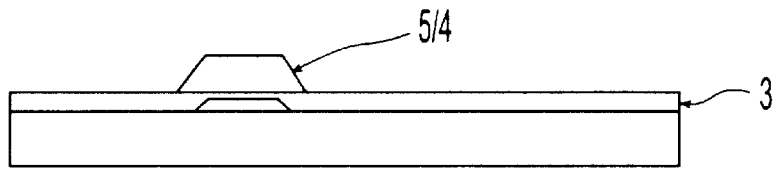
Figure 4C:
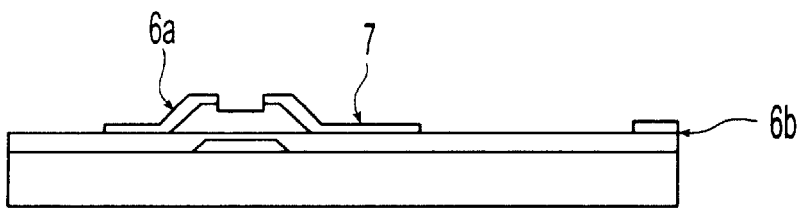
Figure 4D:
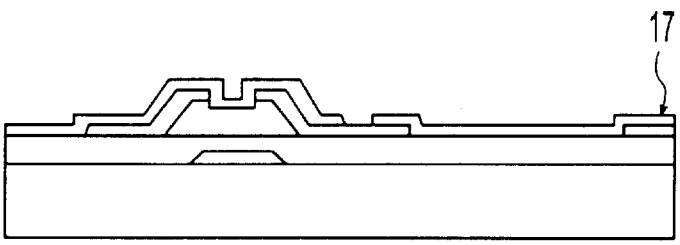
Figure 4E:
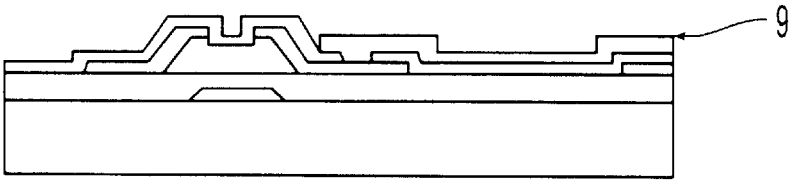
Figure 5:
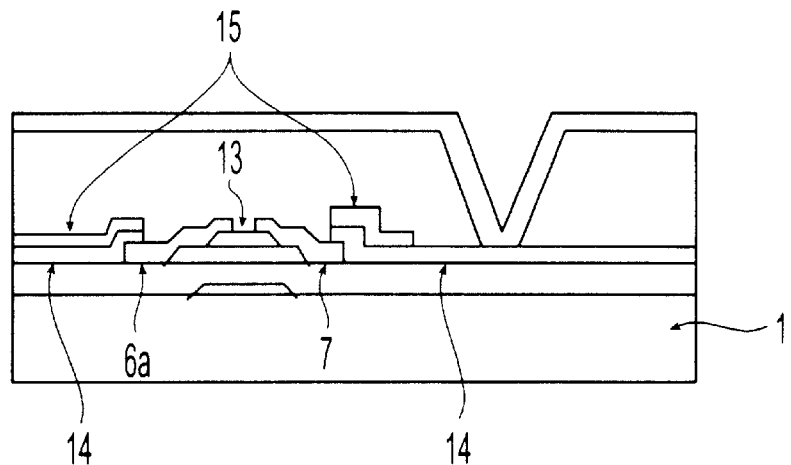
FIG. 5 is a cross sectional view of a TFT portion found in the active matrix wiring substrate in the conventional liquid crystal display device.
Figure 6A:
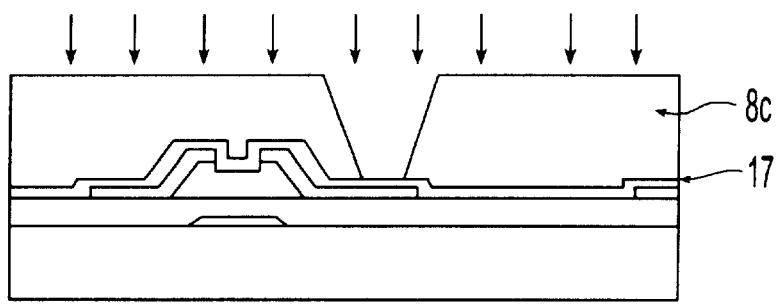
FIG. 6 is an explanatory view for explaining problems occurring in case of applying a high aperture ratio structure to a liquid crystal display device of the prior art I.
Figure 6B:
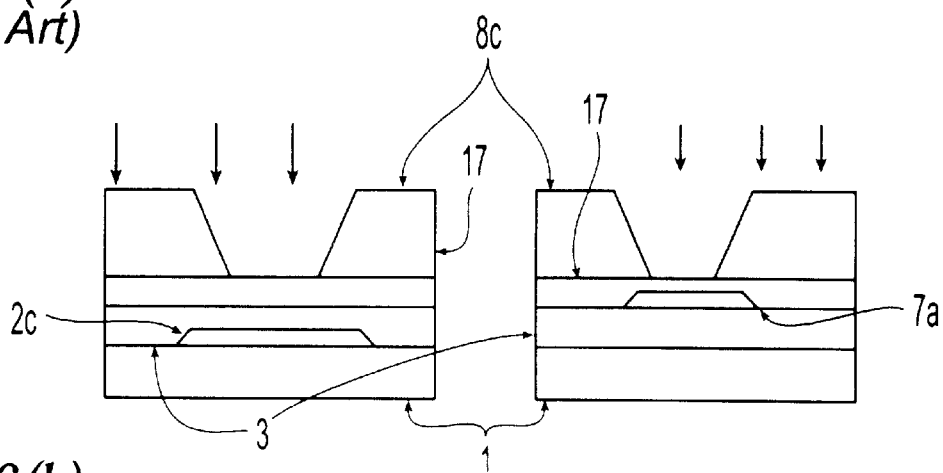

FIG. 1 illustrates a structure of an embodiment showing one pixel portion of an active matrix wiring substrate in a liquid crystal display device. FIG. 1(a) is a plan; FIG. 1(b), a cross sectional view of its TFT part; and FIG. 1(c), a cross sectional view of its terminal portion.

Referring to FIG. 1, plural gate wires 2b and source wires 6b are provided orthogrally to each other on an active matrix wiring substrate. On each of areas surrounded by every two gate wires 2b and two source wires 6b there is provided a pixel electrode 9 superimposed on gate wire 2b and source wire 6b. Further, there is provided on an intersecting area between gate wire 2b and drain wire 6b a TFT 10 having gate electrode 2a connected to the gate wire 2b, source electrode 6a connected to the source wire 6b and a drain electrode connected to the pixel electrode 9 interposed with a contact through-hole 11 formed through an interlaminar insulating film composed of first and second organic interlaminar film 8a and 8b. To the pixel electrode 9 an attached capacitance electrode 12 is connected through the intermediary of the contact through-hole 11. Into the TFT 10, a switching signal is input by way of gate wire 2b and the gate electrode 2a; and an image signal, by way of the source wire 6b and the source electrode 6a. Thereby, electric charge is written to the pixel electrode 9.

Details of the structural features of a liquid crystal display device employed in the following example of the present invention are explained below in reference with a cross sectional view of FIG. 1(b). On a transparent insulating substrate 1 there are provided gate electrode 2a and gate wire 2b covered with a gate insulating film 3 on which a semiconductive layer 4 is provided. The gate electrode 2a is superimposed by the semiconductive layer 4. The source electrode 6a and the drain electrode 7 are separated to each other on the center of the semeconductive layer 4 and connected to the same layer interposed with an ohmic contact layer 5. The ohmic contact layer 5 disposed in an area between the source electrode 6a and the drain electrode 7 are etched off. Thereby, the ohmic contact layer 5 only remains in the area between the source electrode 6a and the semiconductive layer 4 and the area between the drain electrode 7 and the semiconductive layer 4. Further, there are provided thereon first organic insulating film 8a, which covers the top of the laminate including a channel portion resulting from the above step of etching off, and second organic insulating film 8b on the first one in this order. On the second organic insulating film 8b there is provided a transparent conductive film which is intended to form the pixel electrode 9. The transparent conductive film is connected to the drain electrode 7 through the contact through-hole 11 formed through the first and second organic insulating films 8a and 8b.

EXAMPLE 1

An exemplary process of the present invention will be explained as follows. FIG. 2 shows a flow of the process of the present invention.

(A) A metallic film of Al, Mo, Cr or the like is formed on a transparent insulating substrate 1 to a thickness of 100 to 300 nm by using,e.g., a sputtering apparatus followed by photolithographic patterning to form a gate electrode 2a, a gate wire 2b and a gate terminal portion.

(B) A silicon nitride film of 300 to 600 nm in a thickness which is to be a gate insulating film 3, a-silicon layer of 200 to 300 nm in a thickness, which is to be a semiconductive layer 4, and $n^+$-type Si layer of 10 to 100 nm in a thickness, which is to be an ohmic contact layer 5, are successively formed on all over the substrate with a PCDV apparatus to cover the gate electrode 2a and the gate wire 2b followed by patterning the $n^+$-type Si layer and the a-silicon layer into islands.

(C) A metallic film of Mo, Cr or the like is formed on the gate insulating film 3 and also on the n$^+$-type Si layer to a thickness of 100 to 300 nm with the sputtering apparatus followed by photolithographic processing to form a source electrode 6a, source wire 6b, drain electrode 7 and data side terminal portion. Then, unnecessary part of the n$^+$-type Si layer which is located between the source electrode 6b and the drain electrode 7 is removed to form a back channel.

(D) A polysilazane compound, which is to form a first organic interlaminar film 8a, is coated on all over the substrate to a thickness of 100 to 500 nm by spin coating followed by holding at 280° C. for 40 minutes and then at 320° C. for 20 minutes in a calcinating oven to cure the polysilazane compound completely. The above temperatures are best for the calcination temperature. However, when the polysilazane compound is heated up to at least 250° C. to form a cured film, the resultant film may have the function of the passivation film. The above polysilazane compound has a water absorption of 0.45% and is used in a state of xylene solution.

Then, a dimethylene glycol methylethyl ether (MEC) solution of an acrylic family resin, which is to form a second organic interlaminar film 8b, is coated to a thickness of 2.5 to 4.5 μm by spin coating followed by pre-baking at temperatures ranging from 100 to 120° C. for 1 to 4 minutes to half cure the acrylic resin.

Next, a solution of a photoresist 16 whose main ingredient is a novolak resin in which a mixture of 2-heptane (MAK) and ethyl 3-ethoxydiazidosulfonate (EEP) is used as a solvent is coated on the half cured acrylic resin followed by pre-baking at temperatures ranging from 90 to 120° C., i.e., within pre-baking temperatures of the acrylic resin, for 1 to 4 minutes. When the pre-baking temperatures of the acrylic resin are less than 90° C., cracks are caused by vaporization of the solvents used for dissolving the acrylic resin and the photoresist 16 as well as by the difference in stresses between these resins resulting from shrinkage of these resins. Thereby, defects are produced in the pattern of the resultant resist. In this contrast, when the pre-baking temperatures of the acrylic resin exceed 120° C., the under lying acrylic resin layer required to be removed in the next developing step will be cured by heating, and therefore, it will become insoluble in a tetramethylammonium hydroxide (TMAH) solution. When pre-baking temperatures of the positive photoresist exceed those of the acrylic resin, cracks will be caused by the difference in stresses produced between these resins resulting from shrinkage of the components of these resins similarly to the above case. It is necessary for the pre-baking temperatures of the positive photoresist to be controlled in a range of not less than 90° C. in order to cause no crack in the course of pre-baking and no detachment(or removal) of the positive photoresist by dissolution, washing and the like during the next step of development by TMAH.

Thereafter, unnecessary parts, which are to be removed, are treated by imagewise exposure with a light-exposing apparatus. The light-exposed parts of the positive photoresist 16 and at the same time their underlying acrylic resin of the second organic interlaminar layer 8b are dissolved in a solution of TMAH having the concentration of about 0.1 to about 1% by mol by using a developing apparatus to be removed.

(E) Treating by heat (mid-baking) in an oven at 140° C. for 15 minutes prevents the acrylic resin from dissolving in a solution containing DMSO for use in detaching(peeling off) the resist. The residual positive photoresist 16 work as a mask. Accordingly, unnecessary parts of the polysilazane film and gate insulating film 3 on the data side terminal portion and the gate terminal portion can be selectively removed by using SF$_6$ gas. Then, the positive photoresist 16 is detached in the solution containing DMSO for use in detaching the resist at temperatures ranging from 23 to 30° C. When the mid-baking were carried out at temperatures of not more than 130° C., the acrylic resin would absorb the detaching solution and swells to cause cracks during this time. On the other hand, the upperlying positive photoresist 16 cures enough and becomes unable to be detached after mid-baking at temperatures of not less than 160° C.

(F) Finally, a transparent conductive film made of ITO is coated to a thickness of 30 to 100 nm with a sputtering apparatus and then patterned to form a pixel electrode 9.

The above explained 5 photolithographic steps make it possible to prepare a liquid crystal display device capable of bright displaying with improved aperture ratio, in which the pixel electrode 9 and the wires are overlapped with each other, at a cost lower than that of the conventional liquid crystal display device.

EXAMPLE 2

In Example 2, polysiloxane (hereinafter referred as to "siloxane") resin is used as the first organic interlaminar film 8a. This siloxane resin has a water absorption of 0.7. A process applied in this example will be explained as follows according to its preparing steps. The steps from the beginning to removing unnecessary part of the n$^+$-type Si layer corresponding to the back channel area are the same as those of Example 1. Accordingly, explanation of these steps is omitted here. After removing the unnecessary part of the n$^+$-type Si layer, the siloxane resin which is to form the first organic interlaminar film 8a is coated to a thickness of 100 to 500 nm by spin coating, and then held in a calcinating oven at 250° C. for 60 minutes to be cured completely. In this process, the above temperature is best for the calcination temperature. However, in case where the siloxane resin is heated up to not less than 230° C. to form a cured film, the resultant film may have the function of the passivation film. The steps after forming the second organic interlaminar film 8b are the same as those of Example 1. Accordingly, explanation of these steps is omitted here.

The above explained 5 photolithographic steps make it possible to prepare an active matrix wiring substrate which is an essential part of a liquid crystal display device of the present invention.

EXAMPLE 3

In Example 3, benzocyclobutene polymer is used as the first organic interlaminar film 8a. This benzocyclobutene polymer has a water absorption of 0.25%. A process applied in this example will be explained as follows according to its preparing steps. The steps from the beginning to removing unnecessary pert of the n$^+$-type Si layer corresponding to the back channel area are the same as those of Example 1. Accordingly, explanation of these steps is omitted here. After removing the unnecessary part of the n$^+$-type Si layer, the benzocyclobutene polymer which is to form the first organic interlaminar film 8a is coated to a thickness of 100 to 500 nm by spin coating, and then held in a calcinating oven at 300° C. for 60 minutes to be cured by heat. During this time, the above temperature is best for the calcination temperature. However, when the benzocyclobutene polymer is heated up to not less than 250° C. to form a cured film, the resultant film may have the function of the passivation film.

The steps after forming the second organic interlaminar film 8b are the same as those of Example 1. Accordingly, explanation of these steps is omitted here.

The above explained 5 photolithographic steps make it possible to prepare an active matrix wiring substrate which is an essential part of a liquid crystal display device of the present invention.

In the following the meritorious effects of the present invention are summarized.

According to the present invention, an organic insulating film can be directly formed on the source electrode, source wire, drain electrode and back channel without forming a silicon nitride film which has been hitherto formed as a passivation film by using a PCVD apparatus. This is achieved by using a first organic interlaminar film in direct contact with the back channel. This organic interlaminar film is made of, for example, one of polysilazane, siloxane resin and benzocyclobutene polymer, and its preferable water absorption is not more than 1%. It is necessary for the passivation film which protects the back channel of a TFT to have a function of blocking impurity ions and water. Impurity ions have a very slow diffusion rate and a weak diffusion force as compared with water. On this account, it is possible to protect the back channel with the organic interlaminar film which is made of, for example, polysilazane, siloxane resin or benzocyclobutene polymer, and accordingly, has preferable water absorption of not more than 1%, thereby be highly capable of blocking water.

The film requires to have a thickness of not less than 100 nm in order to satisfy the above function. This makes it possible to employ spin coating which can provide the film at low cost with high productivity in stead of forming the passivation film at high cost with low productivity with a PCVD apparatus. Thereby, the production cost of a liquid crystal display device can be greatly reduced.

Further, it is possible to superimpose a pixel electrode with each of gate and source wires to increase the aperture ratio of the liquid crystal display device by forming thickly a low dielectric second organic interlaminar film on the first organic interlaminar film which can be formed by using a spin coater. It is necessary to control the thickness of the second organic interlaminar film to be about 3.8 $\mu$m when its dielectric constant is 3.0 in order to inhibit a crosstalk due to floating capacity produced between the pixel electrode and each of the wires.

Moreover, it is possible to prepare an active matrix wiring substrate through 5 photolithographic steps, which are simple as compared with those of the conventional process for preparing a liquid crystal display device having high aperture ratio, by forming the second organic interlaminar film by the process such as disclosed in the above Example 1.

It should be noted that other objects of the present invention will become apparent in the entire disclosure and that modifications may be done without departing the gist and scope of the present invention as disclosed herein and appended herewith.

Also it should be noted that any combination of the disclosed and/or claimed elements, matters and/or items may fall under the modifications aforementioned.

What is claimed is:

1. A process for preparing a liquid crystal display device, comprising the steps of:
   (A) forming a metallic thin film on a transparent electrode substrate followed by forming gate electrode, gate wire and gate terminals by photolithographic processing;
   (B) forming successively a-Si layer which forms a semiconductive layer and $n^+$-type Si layer which forms an ohmic contact layer to cover said gate electrode and gate wire followed by pattering both of said layers into islands;
   (C) forming a metallic thin film on said both layers followed by forming source electrode, source wire, drain electrode and data side terminal by photolithographic processing, removing unnecessary part of said $n^+$-type Si layer between said source and drain electrodes to form a back channel;
   (D) forming a first organic interlaminar insulating layer over the laminated surface of said substrate comprising said back channel followed by curing completely, and forming a second organic interlaminar insulating layer thereon followed by half curing, coating further thereon a positive photoresist whose essential ingredient is a novolak resin followed by pre-baking, partially light-exposing said positive photoresist for solbulization thereof with a light-exposing apparatus and simultaneously solbulizing said second organic interlaminar insulating film and removing solbulized positive photosensitive resist and second organic interlaminar insulating film to make a contact-through hole;
   (E) after mid-baking in an oven, removing unnecessary parts of said first organic interlaminar insulating film and said gate insulating film which are uncovered with a mask of said positive photoresist remained followed by removing said positive photosensitive resist; and
   (F) forming a transparent conductive film followed by patterning it into pixel electrode.

2. The process for preparing a liquid crystal display device as defined in claim 1, wherein said first organic interlaminar insulating film found in said step (D) comprises at least one organic layer forming material selected from the group consisting of polysilazane, siloxane resin and benzocyclopolybutene polymer.

3. The process for preparing a liquid crystal display device as defined in claim 2, wherein said organic layer forming material has a water absorption of not more than 1%.

4. The process for preparing a liquid crystal display device as defined in claim 1, wherein said second organic interlaminar insulating film comprises an organic layer forming material of an acrylic resin which is soluble in dimethylene glycol methylethyl ether.

5. The process for preparing a liquid crystal display device as defined in claim 1, wherein the solvent of said novolak resin found in said (D) step is a mixture of 2-heptane and ethyl 3-ethoxydiazidosulfonate.

6. The process for preparing a liquid crystal display device as defined in claim 4, wherein said half curing of an acrylic resin-in said step (D) consists of pre-baking at 100 to 200° C. for 1 to 4 minute, and said novolak resin is pre-baked at temperatures ranging from 90 to 120° C. which do not exceed the pre-baking temperatures of said second organic interlaminar insulating film for 1 to 4 minutes.

7. The process for preparing a liquid crystal display device as defined in claim 5, wherein said half curing of an acrylic resin in said step (D) consists of pre-baking at 100 to 200° C. for 1 to 4 minute, and said novolak resin is pre-baked at temperatures ranging from 90 to 120° C. which do not exceed the pre-baking temperatures of said second organic interlaminar insulating film for 1 to 4 minutes.

8. The process for preparing a liquid crystal display device as defined in claim 1, wherein said positive photoresist in said step (D) is developed by using a tetramethyleneammonium hydroxide solution.

9. The process for preparing a liquid crystal display device as defined in claim 1, wherein in step(D) said first and second organic interlaminar insulting layers are formed by spin coating.

10. The process for preparing a liquid crystal display device as defined in claim 1, wherein in step(D), said positive photoresist is formed by spin coating.

* * * * *